(12) United States Patent
Criss et al.

(10) Patent No.: US 8,813,779 B2
(45) Date of Patent: Aug. 26, 2014

(54) WATER RECYCLING SYSTEM FOR SPRINKLERS

(76) Inventors: Anthony J Criss, Escondido, CA (US); Celestino John Gaeta, Carlsbad, CA (US)

( * ) Notice: Subject to any disclaimer, the term of this patent is extended or adjusted under 35 U.S.C. 154(b) by 664 days.

(21) Appl. No.: 12/584,145

(22) Filed: Sep. 1, 2009

(65) Prior Publication Data
US 2011/0048550 A1 Mar. 3, 2011

(51) Int. Cl.
*E03B 11/00* (2006.01)

(52) U.S. Cl.
USPC ...... 137/565.26; 137/395; 137/398; 137/409; 137/565.01

(58) Field of Classification Search
USPC ............ 137/395, 391, 398, 409, 426, 565.01, 137/565.17, 565.26, 565.37
See application file for complete search history.

(56) References Cited

U.S. PATENT DOCUMENTS

| | | | |
|---|---|---|---|
| 4,089,662 A * | 5/1978 | Williams | 96/160 |
| 5,106,493 A | 4/1992 | McIntosh | |
| 5,173,180 A | 12/1992 | Stewart et al. | |
| 5,465,434 A | 11/1995 | Coe | |
| 5,823,711 A | 10/1998 | Herd et al. | |
| 6,635,176 B1 | 10/2003 | Lorente | |
| 6,702,942 B1 | 3/2004 | Nield | |
| 7,025,076 B2 | 4/2006 | Zimmerman, Jr. et al. | |
| 7,207,748 B1 * | 4/2007 | Urban | 137/565.37 |

* cited by examiner

*Primary Examiner* — Kevin Lee

(57) ABSTRACT

A recycling sprinkler system incorporates at least one collection vessel assembly for runoff water, as well as a pump module for recycling a substantial portion of the collected runoff water back into an irrigation sprinkler system along with the primary water source for the irrigation sprinkler system, so that the amount of water required from the primary water source is reduced and a substantial portion of the runoff water is prevented from being discarded.

16 Claims, 6 Drawing Sheets

WATER RECYCLING SYSTEM FOR SPRINKLERS

CROSS REFERENCE TO RELATED APPLICATIONS

None

FEDERALLY SPONSORED RESEARCH

Not applicable

SEQUENCE LISTING OR PROGRAM

Not applicable

BACKGROUND

Various embodiments of this invention relate generally to water conservation and recycling, and, more particularly, to water collection and recycling in irrigation systems for land associated with homes and businesses.

Present-generation sprinkler systems for use in residential and commercial irrigation applications do not generally provide for collection and recycling of runoff water during, or shortly thereafter, the irrigation process. Sprinkler systems fed by a relatively constant source of water such as a city water system generally have this limitation. Furthermore, persistent drought conditions in many areas result in administrative restrictions in water usage, often with penalties imposed for usage above levels set to achieve water conservation goals. Rainwater harvesting incorporates a collection tank to accumulate rain water for use as a water source for a sprinkler system. However, the amount of water available for irrigation with this technique is generally limited by the rainfall amounts. In either case, a provision to collect runoff water and recycle it back into the sprinkler system is lacking. Such runoff water often carries undesirable elements such as fertilizer and pesticides into storm drains that subsequently empty to a discharge region that could include oceans, lakes, or streams.

It is therefore a need to develop a method and apparatus to substantially collect runoff water in water sprinkler systems for irrigation purposes and recycle the collected water back into the sprinkler system.

It is a further need to provide methods to allow for multiple water-collection vessels with isolation of vessels from the recycling process on an individual basis when a vessel lacks sufficient water content so as to avoid introducing air into the recycling system.

SUMMARY

The needs for the invention set forth above as well as further and other needs and advantages of the present invention are achieved by the embodiments of the invention described herein below.

Past sprinkler systems for irrigation purposes do not incorporate a method to collect and recycle runoff water from the land being irrigated. The runoff water is lost. In the case of a typical residential situation, the runoff may carry with it unwanted chemicals into storm drains that empty into other bodies of water, thereby introducing contamination.

The various embodiments of the invention described here are a water pumping system that draws water from collection tanks that collect runoff water via drains normally emptying to a gutter, storm drain, or into regions of land that are not requiring irrigation. The collection tanks contain sensors to detect when a suitable amount of water has been collected, and also when the tank water level is too low for the pumping system to utilize. Electronics monitor the sensors in the collection tanks and enable the pumping system to only pump from tanks that contain sufficient amounts of water. Automatic valves are used to isolate tanks with an insufficient amount of water from the pumping system. Other sensors monitor the sprinkler system to determine when sprinklers are activated. Upon activation of a sprinkler and sufficient water content in at least one collection tank, the water is pumped from at least one collection tank in a manner that combines it with the primary source of sprinkler water such as, but not limited to, a city water supply into at least one conduit that feeds the sprinkler system. A one-way valve provides isolation between the recycled water and the primary water supply. Additionally, the collected water may be treated chemically to prevent growth of bacteria or manage other contaminants.

For a better understanding of the present invention, together with other and further needs thereof, reference is made to the accompanying drawings and detailed description and its scope will be pointed out in the appended claims.

DETAILED DESCRIPTION

Past water irrigation systems are designed primarily to deliver water to a region. A separate system of drains is sometimes, but not always, provided to capture runoff water and discard it to a remote location. This type of irrigation system is inherently wasteful, and not designed for water conservation. Reduction in watering is often imposed by local water authorities during drought conditions. However, this does not directly address the runoff issue but only reduces the amount of water delivered for irrigation. This reduction can be harmful to plants, grass, trees, or anything else in need of water. Sometimes financial loss can result when such plant life dies and must be replaced, or when a farmer suffers a reduction in crop outputs.

A water recycling system that can capture and recycle runoff water through the irrigation system directly addresses and solves the runoff issue. It is intended as a supplement to the primary water source for the irrigation system that allows for efficient application of water to a region, with an associated reduction in the necessary draw from the primary water source.

Figure 1:
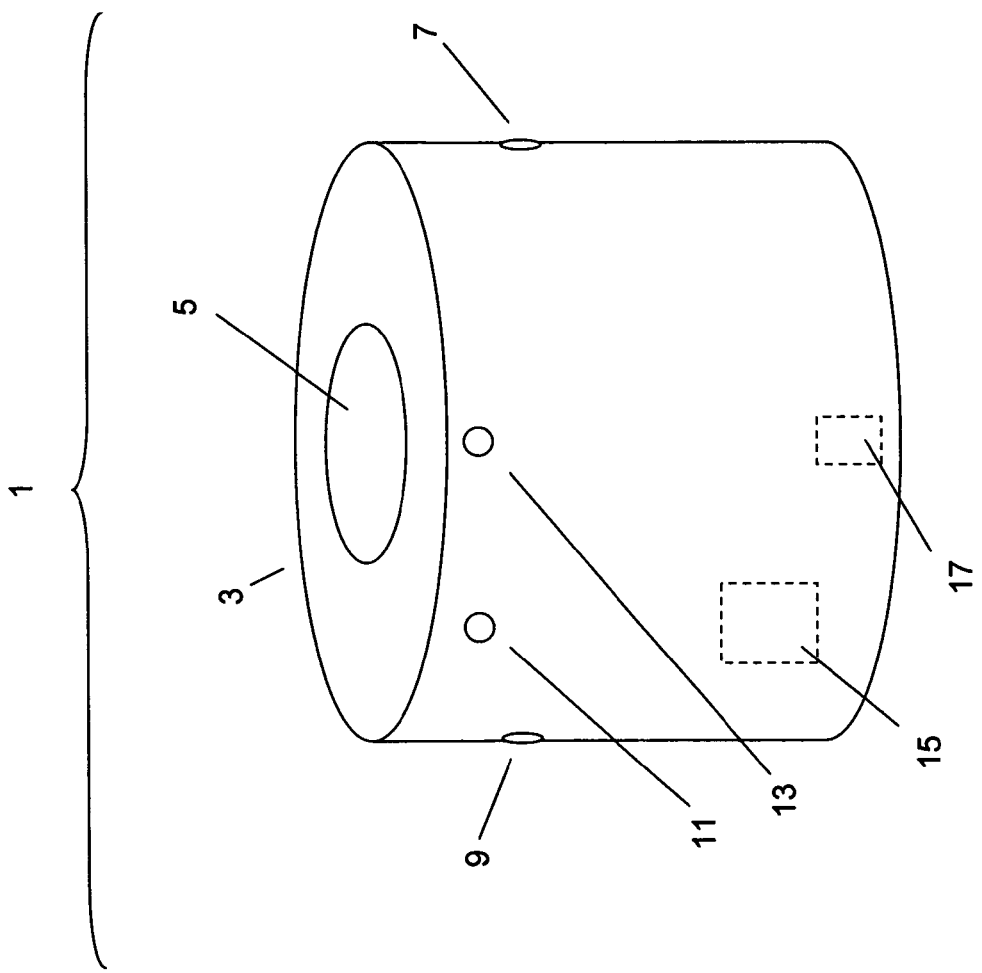
FIG. 1 is a schematic block diagram illustration of an example runoff water collection vessel assembly that is a component of an embodiment of the present invention, in which internal modules are shown in more detail in FIGS. 2 and 3.

The various embodiments of this invention provide a method and apparatus to capture runoff water and recycle it into the irrigation system without the use of high-pressure vessels. Un-pressurized collection vessels are used instead and include, but are not limited to, underground tanks that intercept drain pipes that comprise yard drainage systems. An example, but not limited to, embodiment of a runoff water collection vessel assembly 1 is shown in FIG. 1. A vessel 3 with access cover 5 incorporates a water inlet port 7 and water overflow outlet port 9. Port 11 allows for external connection to a water level monitor 15 located within the vessel 3, and port 13 allows for external connection to a water output assembly 17 located within the vessel 3.

Figure 2:
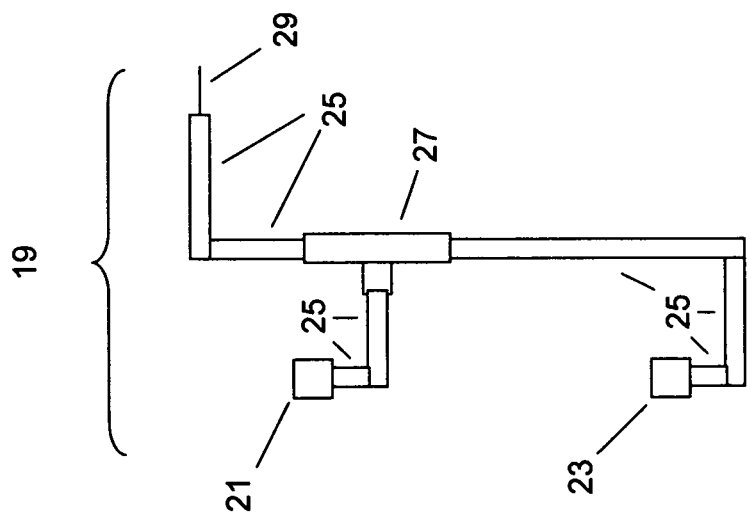
FIG. 2 is a schematic block diagram illustration of a float switch assembly example embodiment of a water level monitor for use in the example vessel of FIG. 1.

FIG. 2 shows an example, but not limited to, embodiment of a water level monitor 19 consisting of, but not limited to, an upper float switch 21 and a lower float switch 23 held in a fixed arrangement by conduit segments 25 such as, but not limited to, Schedule 40 PVC conduit and a TEE union 27 such as, but not limited to, a Schedule 40 PVC TEE union. Electrical cable 29, connected to the upper float switch 21 and the lower float switch 23, provides for external communication of the open or closed condition of the upper float switch 21 and the lower float switch 23. For example, a float switch may be closed electrically when the water level is above the switch location but open electrically when the water level is below the switch location. The upper float switch 21 provides information that a predetermined quantity of water has been collected in the vessel 3, with the predetermined quantity being set by the design of the vessel 3 and the location of the upper float switch 21 within the vessel 3. The lower float switch 23 provides information that a minimum required predetermined quantity of water has been collected in the vessel 3, with the minimum required predetermined quantity being set by the design of the vessel 3 and the location of the lower float switch 23 within the vessel 3.

Figure 3:
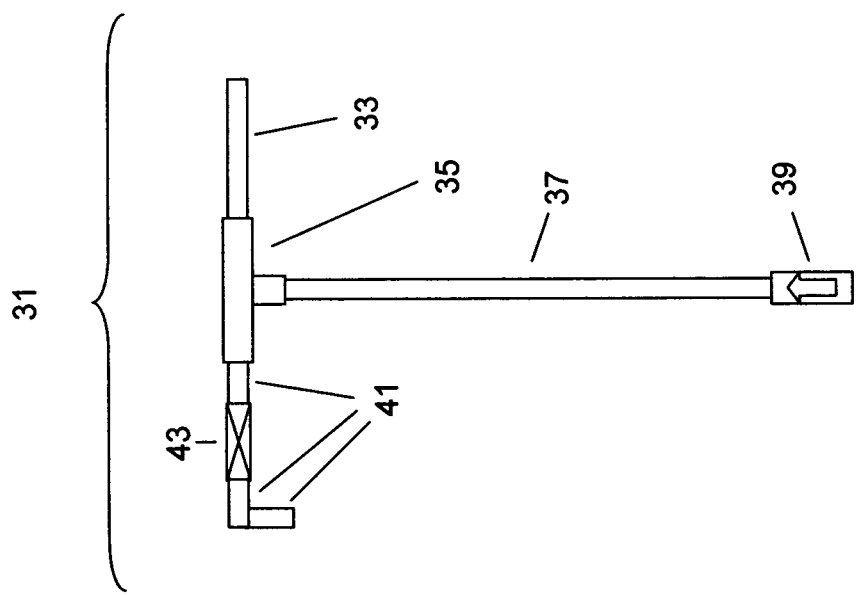
FIG. 3 is a schematic block diagram illustration of a water output assembly example embodiment for use in the example vessel of FIG. 1.

An example, but not limited to, embodiment of a water output assembly 31 is shown in FIG. 3. An access conduit 33 is connected to a first port of a TEE union 35 such as, but not limited to, a Schedule 40 PVC TEE union. A second port of the TEE union 35 is connected to a conduit 37 that is also connected to a first port of a one-way water valve 39 such as, but not limited to, a Schedule 40 PVC check valve. The one-way water valve 39 is operated so that water may only enter it through a second port of the one-way water valve 39. A third port of the TEE union 35 is connected to conduit segments 41 that incorporate a water valve 43 such as, but not limited to, a Schedule 40 PVC ball valve. The conduits 33 and 37, as well as the conduit segments 41, include, but are not limited to, Schedule 40 PVC conduits.

Figure 4:
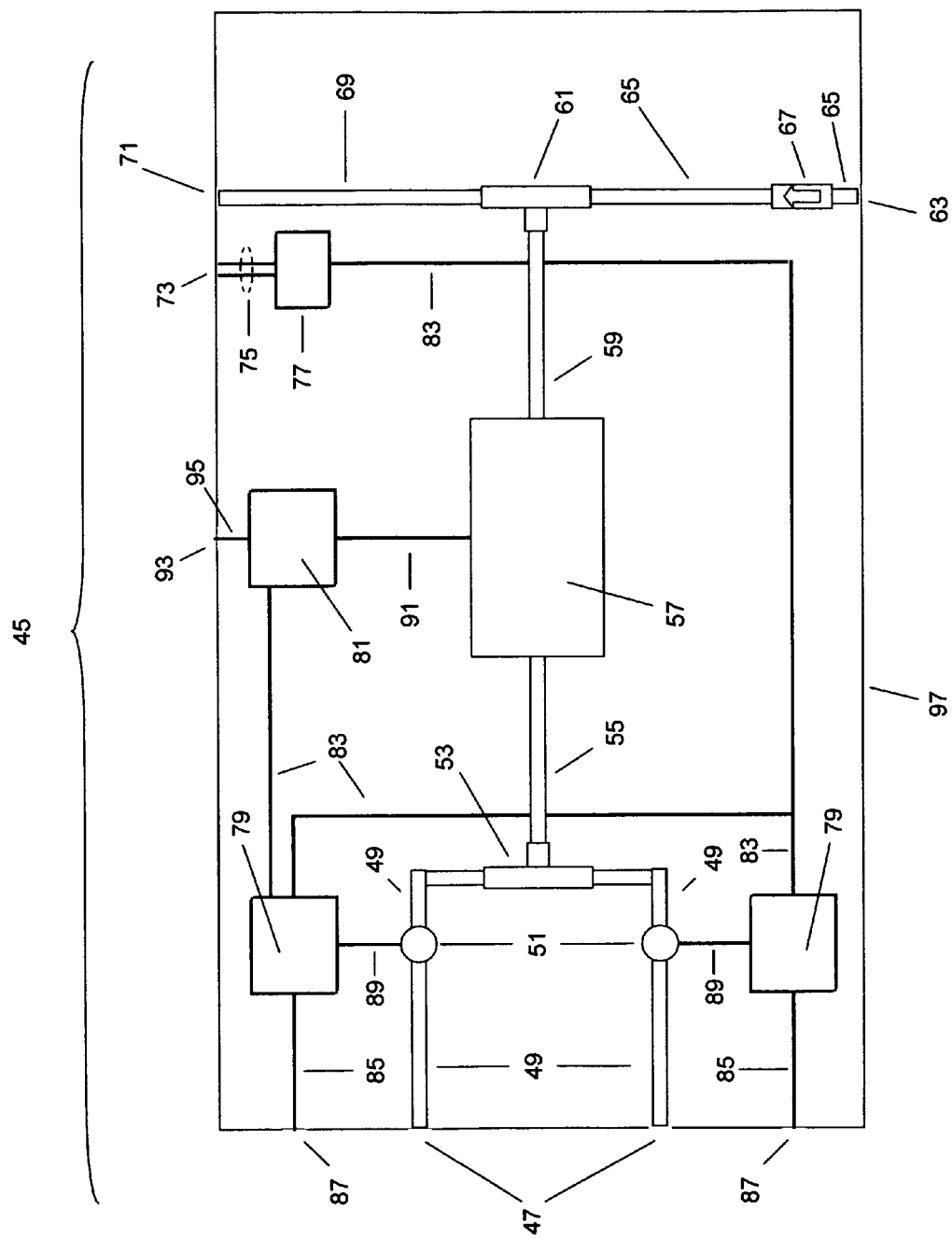
FIG. 4 is a schematic block diagram illustration of an embodiment of a pump module that is a component of an embodiment of the present invention.
Figure 5:
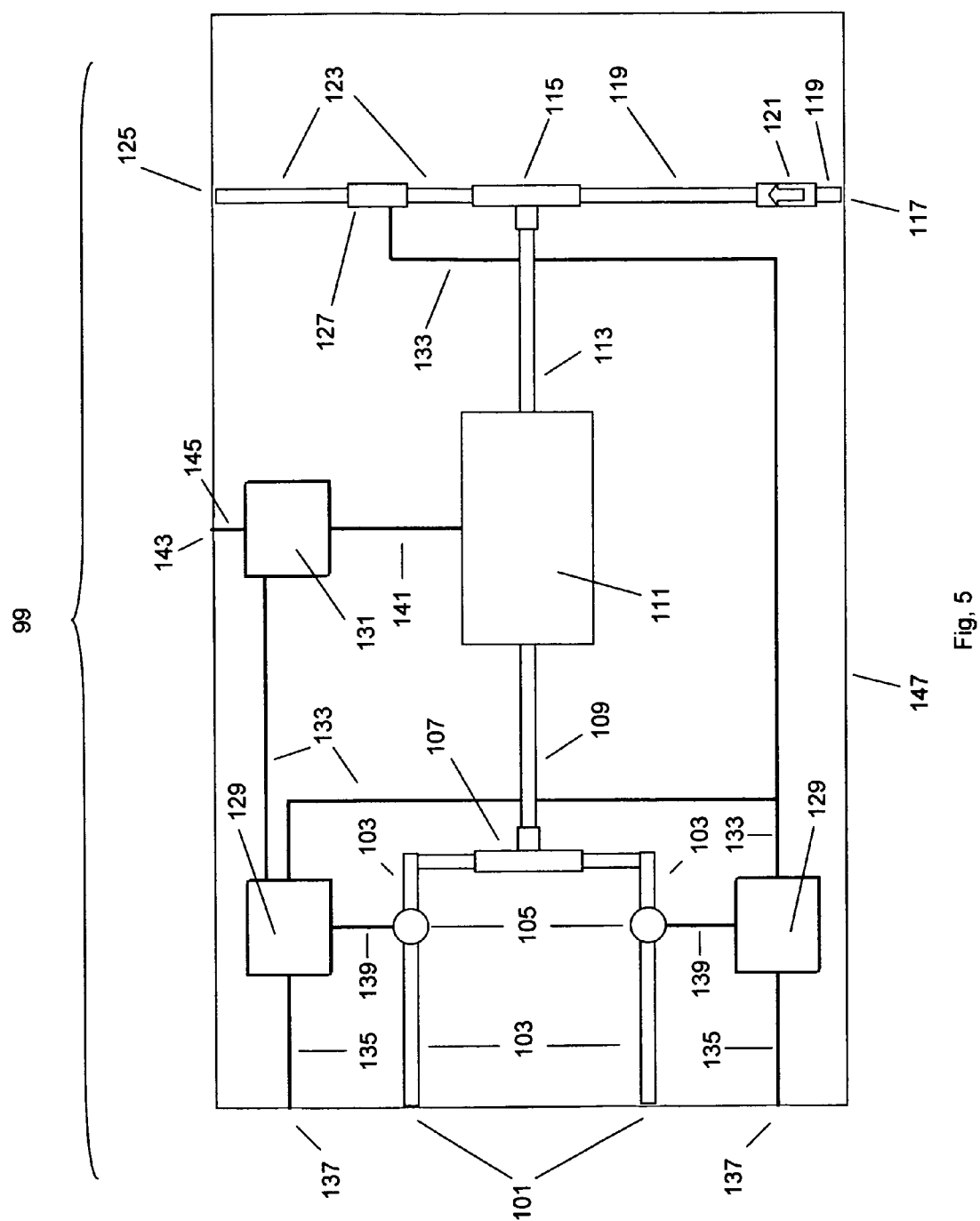
FIG. 5 is a schematic block diagram illustration of another embodiment of a pump module that is a component of an embodiment of the present invention.

The water valve 43 is available for, but not limited to, the purpose of priming the example embodiment of a pump module 45 of FIG. 4 or the example embodiment of a pump module 99 of FIG. 5. During a priming operation that may typically, but not always, be performed at the time of installation or after a prolonged period of non-operation, the water valve 43 is open to allow air to be removed from the system, with the air replaced by pressurized water.

During normal operation, the water valve 43 remains closed so that water enters the second port of the one-way water valve 39 and continues, in sequence, through the conduit 37, the TEE union 35, and the access conduit 33 for output.

The pump module 45 in the example, but not limited to, embodiment of FIG. 4 includes recycle water inlet ports 47 of conduits 49 that include automatic water valves 51 such as, but not limited to, conventional solenoid-controlled zone valves. The conduits 49 are combined at a TEE union 53 such as, but not limited to, a Schedule 40 PVC TEE union. The TEE union 53 is also connected via a conduit 55 to the input of a water pump 57. The output of the water pump 57 is connected via conduit 59 to a first port of a TEE union 61. A primary water input port 63 of conduit 65 is connected to a second port of the TEE union 61. Conduit 65 includes a one-way water valve 67 such as, but not limited to, a Schedule 40 PVC check valve. The one-way water valve 67 is operated so that water cannot exit via the primary water input port 63. A third port of the TEE union 61 is connected to conduit 69 that includes output port 71. The third port of the TEE union 61 outputs water that is combined from water input to the TEE union 61 via the first and second ports of the TEE union 61.

Examples of the conduits 49, 55, 59, 65, and 69 include, but are not limited to, Schedule 40 PVC conduit. Examples of the TEE unions 53 and 61 include, but are not limited to, Schedule 40 PVC TEE unions.

Electrical signals at port 73 are conveyed via electrical cables 75 that are monitored electrically by an electrical monitoring module 77 such as, but not limited to, a conventional current sensor that includes a built-in electromechanical relay. The electrical monitoring module 77 communicates with conduit activation modules 79 and a pump activation module 81 via electrical cables 83. The conduit activation modules 79 gate the flow of water in the conduits 49 between the recycle water inlet ports 47 and the TEE union 53. Examples of the conduit activation modules 79 and the pump activation module 81 include, but are not limited to, conventional electromechanical relays.

The conduit activation modules 79 monitor electrical signals conveyed by electrical cables 85 that are input at ports 87. The automatic water valves 51 are controlled by the conduit activation modules 79 via electrical cables 89, and the water pump 57 is controlled by the pump activation module 81 via electrical cable 91.

Electrical power is supplied at port 93 via electrical cable 95. The pump module 45 is contained within a structure 97.

The pump module 99 in the example, but not limited to, embodiment of FIG. 5 includes recycle water inlet ports 101 of conduits 103 that include automatic water valves 105 such as, but not limited to, conventional solenoid-controlled zone valves. The conduits 103 are combined at a TEE union 107 such as, but not limited to, a Schedule 40 PVC TEE union. The TEE union 107 is also connected via a conduit 109 to the input of a water pump 111. The output of the water pump 111 is connected via conduit 113 to a first port of a TEE union 115. A primary water input port 117 of conduit 119 is connected to a second port of the TEE union 115. Conduit 119 includes a one-way water valve 121 such as, but not limited to, a Schedule 40 PVC check valve. The one-way water valve 121 is operated so that water cannot exit via the primary water input port 117. A third port of the TEE union 115 is connected to conduit 123 that includes an output port 125 and a water flow monitor 127 such as, but not limited to, a conventional water flow switch. The third port of the TEE union 115 outputs water that is combined from water input to the TEE union 115 via the first and second ports of the TEE union 115.

Examples of the conduits 103, 109, 113, 119, and 123 include, but are not limited to, Schedule 40 PVC conduit. Examples of the TEE unions 107 and 115 include, but are not limited to, Schedule 40 PVC TEE unions.

The water flow monitor 127 communicates with conduit activation modules 129 and a pump activation module 131 via electrical cables 133. The conduit activation modules 129 gate the flow of water in the conduits 103 between the recycle water inlet ports 101 and the TEE union 107. Examples of the conduit activation modules 129 and the pump activation module 131 include, but are not limited to, conventional electromechanical relays.

The conduit activation modules 129 monitor electrical signals conveyed by electrical cables 135 that are input at ports 137. The automatic water valves 105 are controlled by the conduit activation modules 129 via electrical cables 139, and the water pump 111 is controlled by the pump activation module 131 via electrical cable 141.

Electrical power is supplied at port 143 via electrical cable 145. The pump module 99 is contained within a structure 147.

Figure 6:
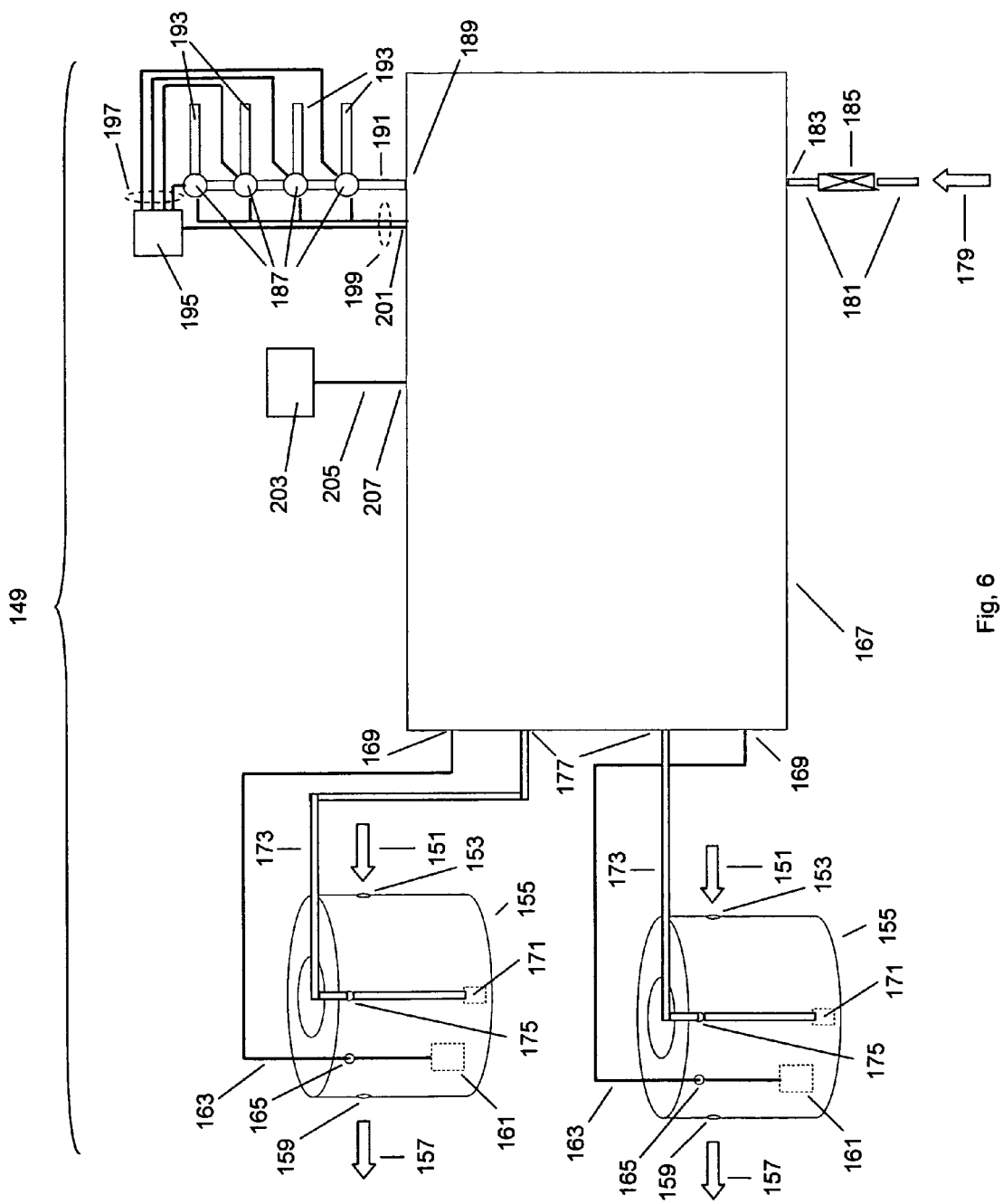
FIG. 6 is a schematic block diagram illustration of a runoff water recycling example system to collect runoff water from yard drainage systems and recycle the water back into the yard sprinkler system.

FIG. 6 shows an example, but not limited to, embodiment of a recycling sprinkler system 149 utilizing the example water collection vessel assembly 1 of FIG. 1, the example water level monitor 19 of FIG. 2, the example water output assembly 31 of FIG. 3, and the example pump module embodiment 45 of FIG. 4. Runoff water 151 is collected by water inlet ports 153 (7 of FIG. 1) of runoff water collection vessel assemblies 155 (1 of FIG. 1). To account for the possibility that the runoff water 151 collected may exceed the collection capacity of the runoff water collection vessel assemblies 155, excess runoff water 157 may, but is not required to, be expelled through water overflow outlet ports 159 (9 of FIG. 1).

Water level monitors 161 (15 of FIG. 1, 19 of FIG. 2) communicate data related to the water quantity in the runoff water collection vessel assemblies 155 via electrical cables 163 and ports 165 (11 of FIG. 1) to a pump module 167 (45 of FIG. 4) at ports 169 (87 of FIG. 4). Water output assemblies 171 (17 of FIG. 1, 31 of FIG. 3) allow the portion of the runoff water 151 collected in the runoff water collection vessel assemblies 155 to enter water conduits 173 and access the pump module 167 via ports 175 (13 of FIG. 1) and ports 177 (47 of FIG. 4).

Primary sprinkler water 179 in water conduit 181 enters primary water input port 183 (63 of FIG. 4) of the pump module 167. The water conduit 181 includes a water valve 185 such as, but not limited to, a Schedule 40 PVC ball valve to allow for possible maintenance activities.

Automatic sprinkler valves 187 such as, but not limited to, conventional solenoid-controlled anti-siphon valves access water output port 189 (71 of FIG. 4) via a water conduit 191. The automatic sprinkler valves 187 also access sprinkler water distribution conduits 193. A sprinkler control module 195 such as, but not limited to, a conventional programmable digital timer controls the automatic sprinkler valves 187 via separate electrical cables 197 and common electrical cables 199. The common electrical cables 199 access the pump module 167 at port 201 (73 of FIG. 4) for monitoring purposes, as explained later below. An electrical power source 203 such as, but not limited to, a conventional 110 volt, alternating current electrical outlet supplies electrical power to the recycling sprinkler system 149 via electrical cable 205 at port 207 (93 of FIG. 4) of the pump module 167.

In a conventional mode of operation, the sprinkler control module 195 electrically closes a circuit, at a pre-selected time and for a pre-selected interval of time, allowing electrical current to flow in the common electrical cables 199 and at least one of the separate electrical cables 197 resulting in at least one of the automatic sprinkler valves 187 opening to allow either one, or a combination, of the primary sprinkler water 179 and the portion of the runoff water 151 input to the pump module 167, to flow from the water output port 189 through at least one of the automatic sprinkler valves 187 to at least one of the sprinkler water distribution conduits 193. Data related to the water quantity in the runoff water collection vessel assemblies 155 that is communicated from the water level monitors 161 to the pump module 167 determines whether, or not, a portion of the runoff water 151 from at least one of the runoff water collection vessel assemblies 155 is output at port 189 when at least one of the automatic sprinkler valves 187 is open by the sprinkler control module 195, whereby the open condition of the automatic sprinkler valves 187 is determined by detecting the presence of electrical current in the common electrical cables 199 at port 201.

The basic principle underlying the various embodiments of this invention is to collect runoff water from yard sprinklers by intercepting water in a yard drain system at common collection points via underground tanks before the runoff water is expelled from the drain system. Water level monitors in the tanks, such as float switches, determine when a sufficient amount of water has been collected for recycling into the irrigation system. The water level monitors are configured to avoid excessive recycling of the pump. For instance, a single float switch would allow the pump to turn on and off more frequently relative to a pair of float switches as suggested in the example embodiment of FIG. 2. The pumping system can be armed for turn-on, but not turned on, when the water level in at least one collection tank is first above the upper float switch and then disarmed when the water level is first below the lower float switch. Note that any collection tank with insufficient water is isolated from the pumping system by one of the automatic water valves (51 in FIG. 4, 105 in FIG. 5).

Once the pumping system is armed, the pump is turned on when at least one sprinkler valve in the yard sprinkler system is opened by the sprinkler system controller. Runoff water from tanks with available water content is then pumped into the sprinkler valves where it may be mixed with the primary water supply for the sprinkler system. If the water pressure at the output of the pump is higher than the pressure at the inlet of the primary water supply, it is possible that the primary water flow may be stopped by the one-way water valve (67 in FIG. 4, 121 in FIG. 5) while the pump is running. When the water level is low enough in all collection tanks, the pump is disarmed so that it does not run. This mode of operation may be even more efficient in terms of reducing the amount of water taken from the primary water supply and contributing to conservation of water. Normally, both the recycled portion of the runoff water and primary water will be combined in the sprinkler system in such a way as to reduce the amount of primary water that would otherwise be utilized during irrigation.

Various embodiments may include fewer, or greater, number of runoff water collection vessel assemblies than as suggested in the example embodiments described above. Furthermore, some or all of the electrical cables described in the example embodiments may be replaced by other components such as, but not limited to, wireless or pneumatic devices. Electrical power need not be supplied externally—for example, a battery or solar power can be employed. Also, certain components such as, but not limited to, those described as being electrical in nature are intended as example components for example embodiments of the invention and not intended to suggest any limitations.

Although the invention has been described with respect to various embodiments, it should be realized this invention is also capable of a wide variety of further and other embodiments within the spirit and scope of the appended claims.

What is claimed is:

1. A pump module comprising:
   means for inputting a first water;
   said first water inputting means incorporating a unidirectional flow valve to prevent reverse water flow into source of said first water;
   means for inputting at least one second water;
   said second water inputting means incorporating at least one automatic valve to modulate flow of said inputting of said at least one second water;
   first activating means for activating said at least one automatic valve;
   communicating means for communicating first external control signals to said first activating means;
   means for pumping said at least one second water;
   means for combining said first water and pumped said at least one second water;
   means for outputting one, the other, or both of said first water and said pumped said at least one second water;
   second activating means for activating said pumping means; and
   sensing means for detecting flow of said first water and communicating second external control signals to said second activating means;
   wherein said first and second activating means act together to coordinate activation of said at least one automatic valve and said pumping means.

2. The pump module of claim 1 further comprising:
   at least one of said first and said second activating means comprises an electromechanical relay.

3. The pump module of claim 1 further comprising:
   said sensing means comprises a flow switch.

4. The pump module of claim 1 further comprising:
   said sensing means comprises an electrical current sensor incorporating an electromechanical relay.

5. The pump module of claim 2 further comprising:
   said sensing means comprises a flow switch.

6. The pump module of claim 2 further comprising:
   said sensing means comprises an electrical current sensor incorporating an electromechanical relay.

7. water recycling system comprising:
   at least one runoff water collection vessel assembly further comprising:
   means for interfacing with outdoor landscape drainage systems to collect runoff water;
   means for storing said collected runoff water;
   first means for determining the presence of at least a predetermined first amount of water stored in said storing means;
   second means for determining the presence of at least a predetermined second amount of said water stored in said storing means;
   first communicating means for communicating said first amount presence and said second amount presence of said stored water; and
   means for unidirectional flow of said stored water outward from said storing means;
   wherein said runoff water collection vessel assembly is capable of residing underground, and said predetermined first and second amounts of said stored water are set by design of said first and second determining means and by location of said first and second determining means on said storing means;
   at least one pump module further comprising:
   means for inputting a first water;
   said first water inputting means incorporating a unidirectional flow valve to prevent reverse water flow into source of said first water;
   means for inputting at least one second water from at least one of said at least one runoff water collection vessel assembly;
   said second water inputting means incorporating at least one automatic valve to modulate flow of said inputting of said at least one second water;
   first activating means for activating said at least one automatic valve;
   second communicating means for communicating first external control signals from at least one of said at least one runoff water collection vessel assembly to said first activating means;
   means for pumping said at least one second water;
   means for combining said first water and pumped said at least one second water;
   means for outputting one, the other, or both of said first water and said pumped said at least one second water;
   second activating means for activating said pumping means; and
   sensing means for detecting flow of said first water and communicating second external control signals to said second activating means;
   wherein said first and second activating means act together to coordinate activation of said at least one automatic valve and said pumping means.

8. The water recycling system of claim 7 further comprising:
   at least one of said first and said second activating means comprises an electromechanical relay.

9. The water recycling system of claim 7 further comprising:
   said sensing means comprises a flow switch.

10. The water recycling system of claim 7 further comprising:
    said sensing means comprises an electrical current sensor incorporating an electromechanical relay.

11. The water recycling system of claim 8 further comprising:
    said sensing means comprises a flow switch.

12. The water recycling system of claim 8 further comprising:
    said sensing means comprises an electrical current sensor incorporating an electromechanical relay.

13. The water recycling system of claim 8 further comprising:
    at least one automatic sprinkler valve;
    wherein flow of water through said at least one automatic sprinkler valve is monitored by said sensing means.

14. The water recycling system of claim 10 further comprising:
    at least one automatic sprinkler valve; and
    at least one automatic sprinkler valve controller;
    wherein electrical current between said at least one automatic sprinkler valve controller and said at least one automatic sprinkler valve is monitored by said sensing means.

15. The water recycling system of claim 11 further comprising:
    at least one automatic sprinkler valve;
    wherein flow of water through said at least one automatic sprinkler valve is monitored by said sensing means.

16. The water recycling system of claim 12 further comprising:
   at least one automatic sprinkler valve; and
   at least one automatic sprinkler valve controller;
   wherein electrical current between said at least one automatic sprinkler valve controller and said at least one automatic sprinkler valve is monitored by said sensing means.

* * * * *